United States Patent
Raji et al.

(10) Patent No.: US 12,315,491 B1
(45) Date of Patent: May 27, 2025

(54) EXPRESSIVE SPEECH AUDIO GENERATION FOR VIDEO GAMES

(71) Applicant: Electronic Arts Inc., Redwood City, CA (US)

(72) Inventors: Shahab Raji, Foster City, CA (US); Siddharth Gururani, Santa Clara, CA (US); Zahra Shakeri, Newark, CA (US); Kilol Gupta, Redwood City, CA (US); Ping Zhong, Mountain View, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 18/440,462

(22) Filed: Feb. 13, 2024

Related U.S. Application Data

(63) Continuation of application No. 17/527,539, filed on Nov. 16, 2021, now abandoned.

(51) Int. Cl.
| | |
|---|---|
| *G10L 13/00* | (2006.01) |
| *A63F 13/54* | (2014.01) |
| *G06N 20/00* | (2019.01) |
| *G10L 13/047* | (2013.01) |

(Continued)

(52) U.S. Cl.
CPC ............ *G10L 13/047* (2013.01); *A63F 13/54* (2014.09); *G06N 20/00* (2019.01); *G10L 15/02* (2013.01); *G10L 15/16* (2013.01); *A63F 2300/6081* (2013.01)

(58) Field of Classification Search
CPC ......... G10L 13/033; G10L 13/04; A63F 13/40
See application file for complete search history.

(56) References Cited

U.S. PATENT DOCUMENTS

| 11,295,721 B2 * | 4/2022 | Gururani | ................. G06N 3/08 |
| 11,605,388 B1 * | 3/2023 | Gupta | .................. A63F 13/424 |

(Continued)

OTHER PUBLICATIONS

Devlin, Jacob et al., BERT: Pre-training of Deep Bidirectional Transformers for Language Understanding, Cornell University arXiv:1810.04805v2, 16 pages, dated May 24, 2019.

(Continued)

*Primary Examiner* — Daniel Abebe
(74) *Attorney, Agent, or Firm* — Gray Ice Higdon

(57) ABSTRACT

This specification describes a computer-implemented method of training a machine-learned speech audio generation system to generate predicted acoustic features for generated speech audio for use in a video game. The training comprises receiving one or more training examples. Each training example comprises: (i) ground-truth acoustic features for speech audio, (ii) speech content data representing speech content of the speech audio, and (iii) speech expression data representing speech expression of the speech audio. Parameters of the machine-learned speech audio generation system are updated by: (i) minimizing a measure of difference between the predicted acoustic features for a training example and the corresponding ground-truth acoustic features of the training example, and (ii) minimizing a measure of difference between the predicted prosodic features for the training example and the corresponding ground-truth prosodic features for the training example.

20 Claims, 5 Drawing Sheets

(51) Int. Cl.
    *G10L 15/02*     (2006.01)
    *G10L 15/16*     (2006.01)

(56) References Cited

U.S. PATENT DOCUMENTS

| | | | |
|---|---|---|---|
| 11,790,884 B1* | 10/2023 | Shakeri | G10L 21/007 |
| | | | 704/258 |
| 2009/0204395 A1* | 8/2009 | Kato | G10L 13/033 |
| | | | 704/E11.001 |
| 2019/0172443 A1* | 6/2019 | Shechtman | G10L 13/047 |
| 2021/0304783 A1* | 9/2021 | Kons | G10L 17/06 |
| 2023/0343319 A1* | 10/2023 | Hu | G06N 3/0442 |

OTHER PUBLICATIONS

Reimers, Nils et al., Sentence-BERT: Sentence Embeddings using Siamese BERT-Networks, Ubiquitous Knowledge Processing Lab, UKP-TUDA, 11 pages, dated Aug. 27, 2019.

Brown, Tom B. et al., Language Models are Few-Shot Learners, Cornell University arXiv:2005.14165v4, 75 pages, dated Jul. 22, 2020.

Kim, Minchan et al., Expressive Text-to-Speech using Style Tag, Department of Electrical and Computer Engineering and INMC, Seoul National University, South Korea, 5 pages, Apr. 1, 2021.

\* cited by examiner

EXPRESSIVE SPEECH AUDIO GENERATION FOR VIDEO GAMES

BACKGROUND

The provision of realistic speech audio is an important part of video game development. It may be desirable to provide a speech audio generation system that can be used as one way to generate realistic speech audio for video games and that also allows for fine-grained control of the expression of generated speech audio.

SUMMARY

In accordance with a first aspect, this specification describes a computer-implemented method of training a machine-learned speech audio generation system to generate predicted acoustic features for generated speech audio for use in a video game. The training comprises receiving one or more training examples. Each training example comprises: (i) ground-truth acoustic features for speech audio, (ii) speech content data representing speech content of the speech audio, and (iii) speech expression data representing speech expression of the speech audio. For each of the one or more training examples an expression embedding is generated by an expression encoder. This comprises processing the speech expression data. A speech content embedding is generated by a speech content encoder of a synthesizer. This comprises processing the speech content data. A combined embedding is decoded, by a decoder of the synthesizer, to generate predicted acoustic features for the training example. The combined embedding comprises a combination of the expression embedding and the speech content embedding. Predicted prosodic features are generated, by a prosody feature extractor, by processing the predicted acoustic features. Ground-truth prosodic features are generated, by a prosody feature extractor, by processing the ground-truth acoustic features. Parameters of the machine-learned speech audio generation system are updated by: (i) minimizing a measure of difference between the predicted acoustic features for a training example and the corresponding ground-truth acoustic features of the training example, and (ii) minimizing a measure of difference between the predicted prosodic features for the training example and the corresponding ground-truth prosodic features for the training example.

In accordance with a second aspect, this specification describes a computing system to train a machine-learned speech audio generation system to generate predicted acoustic features for generated speech audio for use in a video game. The system is configured to receive one or more training examples. Each training example comprises: (i) ground-truth acoustic features for speech audio, (ii) speech content data representing speech content of the speech audio, and (iii) speech expression data representing speech expression of the speech audio. For each of the one or more training examples an expression embedding is generated by an expression encoder. This comprises processing the speech expression data. A speech content embedding is generated by a speech content encoder of a synthesizer. This comprises processing the speech content data. A combined embedding is decoded, by a decoder of the synthesizer, to generate predicted acoustic features for the training example. The combined embedding comprises a combination of the expression embedding and the speech content embedding. Predicted prosodic features are generated, by a prosody feature extractor, by processing the predicted acoustic features. Ground-truth prosodic features are generated, by a prosody feature extractor, by processing the ground-truth acoustic features. Parameters of the machine-learned speech audio generation system are updated by: (i) minimizing a measure of difference between the predicted acoustic features for a training example and the corresponding ground-truth acoustic features of the training example, and (ii) minimizing a measure of difference between the predicted prosodic features for the training example and the corresponding ground-truth prosodic features for the training example.

In accordance with a third aspect, this specification describes a non-transitory computer-readable medium storing instructions, which when executed by a processor, cause the processor to: receive one or more training examples, each training example comprising: (i) ground-truth acoustic features representing speech audio, (ii) speech content data representing speech content of the speech audio, and (iii) speech expression data representing speech expression of the speech audio; for each of the one or more training examples: generate, by an expression encoder, an expression embedding, comprising processing the speech expression data; generate, by a speech content encoder of a synthesizer, a speech content embedding, comprising processing the speech content data; decode, by a decoder of the synthesizer, a combined embedding to generate predicted acoustic features for the training example, wherein the combined embedding comprises a combination of the expression embedding and the speech content embedding; generate, by a prosody feature extractor: (i) predicted prosodic features by processing the predicted acoustic features, and (ii) ground-truth prosodic features by processing the ground-truth acoustic features; and update parameters of the machine-learned speech audio generation system by: (i) minimizing a measure of difference between the predicted acoustic features for a training example and the corresponding ground-truth acoustic features of the training example, and (ii) minimizing a measure of difference between the predicted prosodic features for the training example and the corresponding ground-truth prosodic features for the training example.

DETAILED DESCRIPTION

General Definitions

Figure 1:
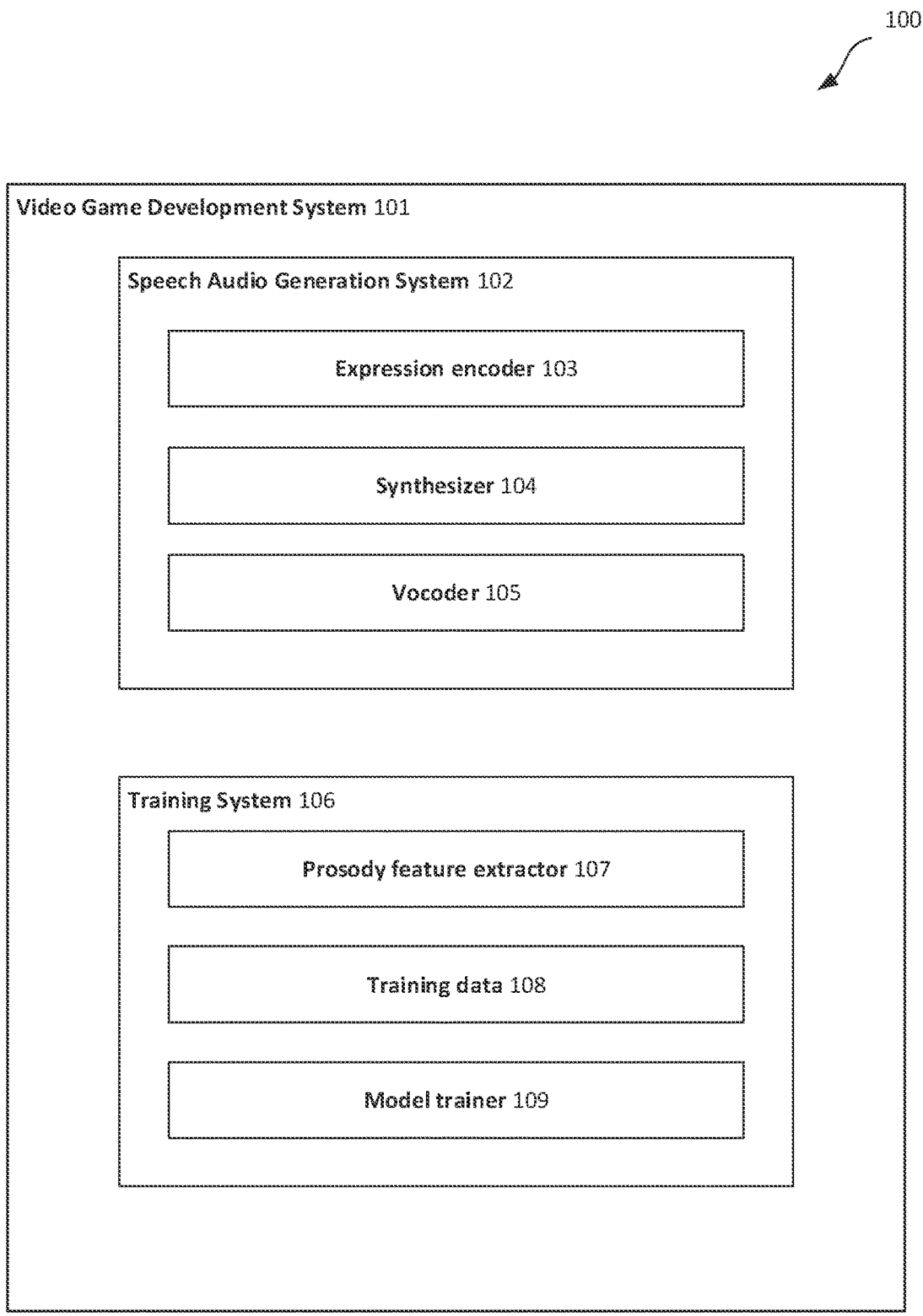
FIG. 1 is a schematic block diagram illustrating an example of a computer system for training a machine-learned speech audio generation system.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "video game" as used in some embodiments described herein, is a virtual interactive environment in which players engage.

"Speech" as used in some embodiments described herein may include sounds in the form of spoken words in any language, whether real or invented and/or other utterances including paralinguistics such as sighs, yawns, moans etc. "Speech audio" refers to audio (e.g. audio data) which includes or represents speech, and may comprise data in any suitable audio file format whether in a compressed or uncompressed format.

"Acoustic features" as used in some embodiments described herein may include any suitable acoustic representation of frequency, magnitude and/or phase information of speech audio. For example, acoustic features may comprise linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof.

"Text" as used in some in embodiments described herein refers to any suitable representation of characters, words or symbols that may be used to represent language and/or speech. In some cases text may be input by use of a keyboard and/or stored in memory in the form of text data. Text may comprise text data in any suitable compressed or uncompressed format, e.g. ASCII format.

"Prosody" as used in some embodiments described herein refers to the way in which speech is expressed, e.g. the intonation, pitch, volume, timing (e.g. rhythm, speech rate) and/or tone of speech. It may include pronunciation aspects such as articulation or stress and/or performance aspects such as intensity/arousal or valence. In some embodiments described herein prosody may be represented by prosodic features which may be derived from pitch and/or volume contours, timing information, etc. and may be predicted using the models described herein.

A "speech audio generation system" as used in some embodiments described herein, is a system that receives an indication of an utterance (e.g. speech content data) and outputs speech audio corresponding to the indication. Various characteristics of the output speech audio may be varied by speech audio generation system modules described herein, e.g. speech content, speaker identity, and speech expression.

It should be understood that speech audio for use in video games can be generated in a number of ways, including by humans, machines or a combination of both, as deemed appropriate or optimal based on various factors known to those of skill in the art. The example implementations described herein provide systems and methods for training a machine-learned speech audio generation system to predict acoustic features for generated speech audio for use in a video game. In many video games, it is desirable for the expression of speech audio to be appropriate for the context of the video game for which the speech audio is output. Example systems and methods described in this specification provide one means through which users can generate speech audio for video games with fine-grained control in the expression of the generated speech audio. Thus, speech audio generated using the systems and methods described herein can express a wide-varying range of expressions.

The systems and methods described in this specification enable the training of a machine-learned speech audio generation system that receives speech expression data and speech content data, and generates acoustic features for speech audio with speech content as specified by the speech content data and speech expression as specified by the speech expression data.

In particular, the described systems and methods make use of a prosody feature extractor when training the machine-learned speech audio generation system (or components thereof). During processing of a training example comprising ground-truth acoustic features for speech audio, the prosody feature extractor generates "ground-truth" prosodic features from the ground-truth acoustic features and generates predicted prosodic features from the predicted acoustic features generated by the speech audio generation system for the training example. A comparison is made between the predicted prosodic features and the ground-truth prosodic features and parameters of the speech audio generation system are updated based on the comparison.

In this way, the prosody feature extractor is used as a feedback mechanism when training the speech audio generation system, ensuring that the expression of speech audio according to the predicted acoustic features closely matches the expression of speech audio according to the ground-truth acoustic features, based on the received speech expression data. The prosody feature extractor is used to train an expression encoder of the speech audio generation system to learn expression embeddings from speech expression data that accurately capture aspects of speech expression.

After training, the machine-learned speech audio generation system is used to generate speech audio in accordance with input data comprising speech content data specifying speech content for the generated speech audio, and speech expression data specifying speech expression for the generated speech audio. The generated speech audio may be stored for use in a video game application.

FIG. 1 is a schematic block diagram illustrating an example of a computer system 100 for training a speech audio generation system 102 as part of a video game development system 101. The video game development system 101 comprises a speech audio generation system 102 and a training system 106 for training components of the speech audio generation system 102. The speech audio generation system 102 is used or otherwise accessed by users when generating speech audio during a video game development process.

The speech audio generation system 102 comprises machine-learned models used to generate speech audio for video games. The speech audio generation system 102 comprises an expression encoder 103, a synthesizer 104, and a vocoder 105.

The expression encoder 103 receives speech expression data specifying expression information for the speech audio to be generated by the speech audio generation system 102. The speech expression data may comprise text data specifying a particular speech expression. For example, the speech expression data may indicate a speech expression as natural language, e.g. "Surprised", "In disbelief", "Accusingly", etc. In some cases, the speech expression data may implicitly indicate a speech expression, for example by indicating a particular context of the video game such as "Running away from demons". The text data may be any digital data representing text. The speech expression data may be encoded by a sequence of vectors with each vector representing a character of the speech expression data. The elements of a character vector may correspond with one character out of a set of possible characters, with each character represented by a character vector with only one non-zero element (also known as a one-hot vector). Additionally or alternatively, the speech expression data may be represented by continuous embeddings, e.g. character embeddings and/or word embeddings.

The expression encoder 103 processes the speech expression data and generates an expression embedding representing the expression information specified in the speech expression data. The expression embedding may be a single fixed-length embedding for the speech expression data, e.g. the expression embedding may be a single vector of a particular dimension.

The synthesizer 104 receives the expression embedding, and speech content data specifying speech content for the speech audio to be generated by the speech audio generation system 102. The speech content data may comprise text data. The text data may be any digital data representing text. Additionally or alternatively, the data representing speech content may comprise one or more indications of paralinguistic information. Any paralinguistic utterance may be indicated in the speech content, such as sighs, yawns, moans, laughs, grunts, etc. The speech content may be encoded by a sequence of vectors with each vector representing a character of the speech content. For example, a character may be a letter, a number, and/or a tag indicating a paralinguistic utterance. The elements of a character vector may correspond with one character out of a set of possible characters, with each character represented by a character vector with only one non-zero element (also known as a one-hot vector). Additionally or alternatively, the speech content may be represented by continuous embeddings, e.g. character embeddings and/or word embeddings.

The synthesizer 104 processes the speech content data and generates a speech content embedding. The speech content embedding may comprise a sequence of embeddings. For example, an embedding may be generated for each time step of the speech content data, and a speech content embedding may be formed from the embeddings of each time step. The synthesizer 104 combines the expression embedding, and speech content embedding, and generates a combined embedding. The synthesizer 104 decodes the combined embedding and generates predicted acoustic features for the speech audio to be generated. The predicted acoustic features represent acoustic features for speech audio with speech content as specified by the speech content data and speech expression as specified by the speech expression data.

The predicted acoustic features may comprise any low-level acoustic representation of frequency, magnitude and phase information of speech audio such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The vocoder 105 receives the predicted acoustic features and generates generated speech audio. The generated speech audio comprises a waveform of speech audio. The generated speech audio is speech audio with speech content as specified by the speech content data and speech expression as specified by the speech expression data.

The training system 106 is used or otherwise accessed when training components of the speech audio generation system 102. The training system 106 comprises a prosody feature extractor 107, training data 108 comprising a plurality of training examples, and a model trainer 109.

As will be described in greater detail in relation to FIG. 3, during training of the speech audio generation system 102, the prosody feature extractor 107 receives ground-truth acoustic features of a training example, and predicted acoustic features generated by the synthesizer 104 for the training example. The prosody feature extractor 107 generates "ground-truth" prosodic features from processing the ground-truth acoustic features, and generates predicted prosodic features from processing the predicted acoustic features. The prosodic features represent the prosody of speech audio corresponding to the respective acoustic features from which the prosodic features were generated. For example, the prosodic features may relate to (or represent) the volume and/or pitch of speech audio for the acoustic features. The prosody feature extractor 107 may output a single prosody vector representing global prosodic features for the acoustic features.

The ground-truth prosodic features and predicted prosodic features are compared, and the results of the comparison are used to update parameters of the speech audio generation system 102. In this way, the prosody feature extractor 107 may act as a feedback mechanism when training the speech audio generation system 102, and ensure that the expression of speech audio corresponding to the ground-truth acoustic features is preserved in the predicted acoustic features. In particular, the prosody feature extractor 107 is used to train the expression encoder 103 to generate expression embeddings which accurately capture the expression information specified in speech expression data, which expression embeddings are processed by the synthesizer 104 to generate the predicted acoustic features.

During training, model trainer 109 receives one or more training examples from training data 108, and processes the training examples to update parameters of the speech audio generation system 102. The training process is described in more detail below in relation to FIG. 3.

Figure 2:
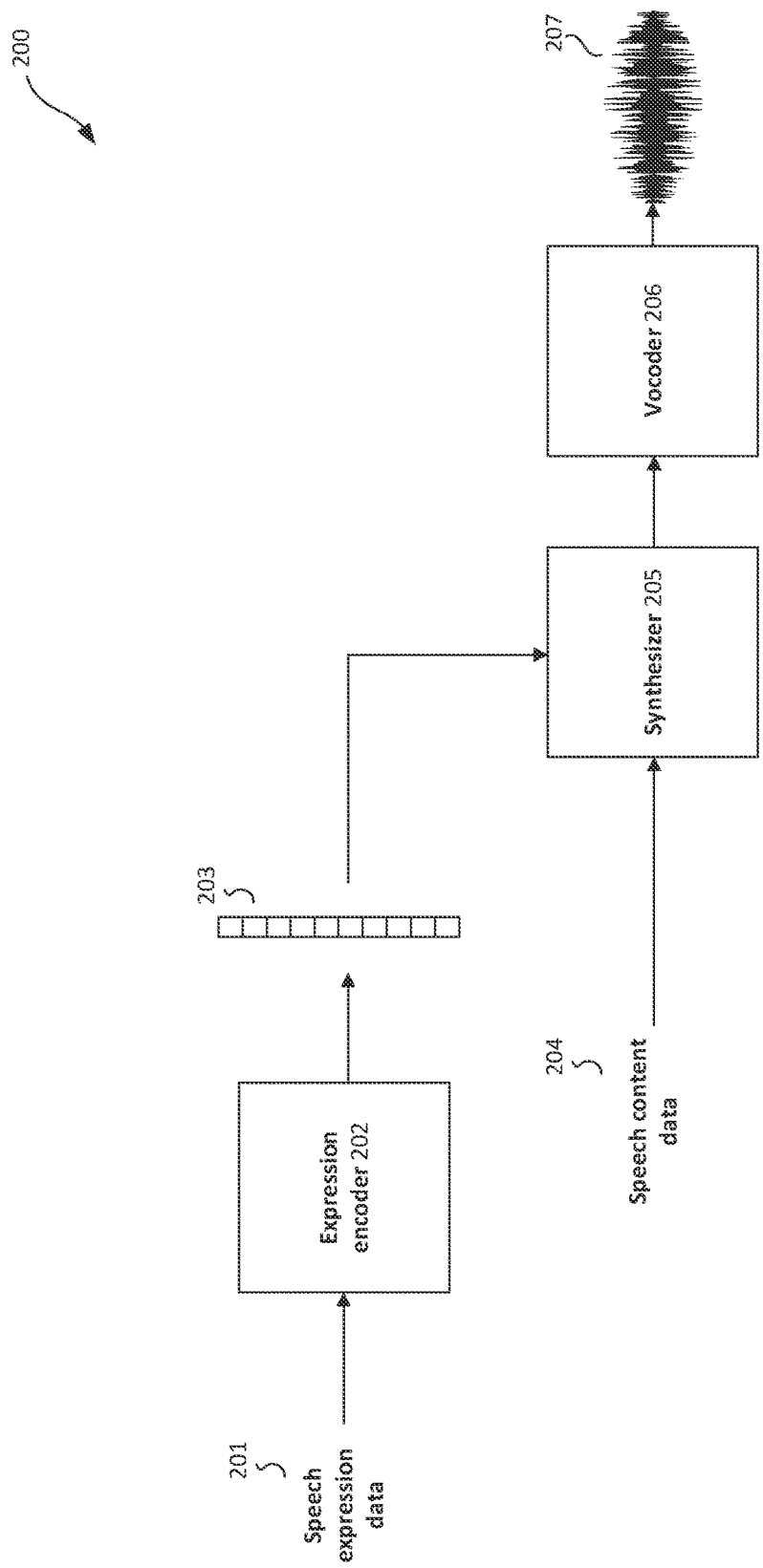
FIG. 2 illustrates an example method of generating speech audio using a machine-learned speech audio generation system.

FIG. 2 illustrates an example method 200 of generating speech audio 207 using a machine-learned speech audio generation system.

Speech expression data 201 is received by an expression encoder 202. The speech expression data 201 specifies expression information for the speech audio to be generated by the speech audio generation system. The speech expression data may comprise text data specifying a particular speech expression. For example, the speech expression data may indicate a speech expression as natural language, e.g. "Surprised", "In disbelief", "Accusingly", etc. In some cases, the speech expression data may implicitly indicate a speech expression, for example by indicating a particular context of the video game such as "Running away from demons". The text data may be any digital data representing text. The speech expression data may be encoded by a sequence of vectors with each vector representing a character of the speech expression data. The elements of a character vector may correspond with one character out of a set of possible characters, with each character represented by a character vector with only one non-zero element (also known as a one-hot vector). Additionally or alternatively, the speech expression data may be represented by continuous embeddings, e.g. character embeddings and/or word embeddings.

The expression encoder 202 comprises a machine-learning model that has been trained to generate an expression embedding 203 from speech expression data 201. The expression encoder 202 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

Speech content data 204 is received by the synthesizer 205. The speech content data 204 may comprise text data. The text data may be any digital data representing text. Additionally or alternatively, the data representing speech content may comprise one or more indications of paralinguistic information. Any paralinguistic utterance may be indicated in the speech content, such as sighs, yawns, moans, laughs, grunts, etc. The speech content may be encoded by a sequence of vectors with each vector representing a character of the speech content. For example, a character may be a letter, a number, and/or a tag indicating a paralinguistic utterance. The elements of a character vector may correspond with one character out of a set of possible characters, with each character represented by a character vector with only one non-zero element (also known as a one-hot vector). Additionally or alternatively, the speech content may be represented by continuous embeddings, e.g. character embeddings and/or word embeddings.

The synthesizer 205 comprises a machine-learning model that has been trained to generate predicted acoustic features from processing the speech content data 204 and expression embedding 203.

The synthesizer 205 comprises a speech content encoder, a combining operation, and a decoder.

The speech content encoder of the synthesizer 205 processes the speech content data 204 and generates a speech content embedding. The speech content embedding may comprise a sequence of embeddings. For example, an embedding may be generated for each time step of the speech content data, and a speech content embedding may be formed from the embeddings of each time step. The speech content encoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The combining operation of the synthesizer 205 combines the expression embedding 203 and speech content embedding, and generates a combined embedding. Where the speech content embedding comprises a sequence of embeddings, the combining operation may be configured to generate a combined embedding that also comprises a sequence of embeddings. For example, the combining operation may combine each embedding of the sequence of embeddings of the speech content embedding with the expression embedding 203. The combining operation may comprise any binary operation resulting in a single embedding. For example, the combination operation may be performed by an addition, an averaging, a dot product, a concatenation, etc.

The expression encoder 202 may be configured to produce vector outputs having dimension(s) adapted for combination, during the combining operation, with the vector output(s) of the speech content encoder. For example in some embodiments the speech content encoder and the expression encoder 202 may generate vector outputs of the same dimension, which may be combined by a suitable operation such as addition.

The decoder of the synthesizer 205 decodes the combined embedding and generates predicted acoustic features for the speech audio to be generated. The decoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

In some implementations, the decoder comprises an attention mechanism. In these implementations, the combining operation generates a combined embedding comprising an embedding for each input time step of the speech content data 204, as described above. For an output time step, the attention mechanism receives the embedding of each input time step and generates attention weights for each of the embeddings. The attention mechanism averages each embedding by the respective attention weight to generate a context vector for the output time step. When decoding to produce predicted acoustic features for an output time step, the decoder decodes the context vector for the output time step.

The vocoder 206 receives the predicted acoustic features and generates generated speech audio 207. The generated speech audio 207 comprises a waveform of speech audio. The vocoder 206 may comprise a machine-learning model that has been trained to generate speech audio from acoustic features. The vocoder 206 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The expression encoder 202 and the synthesizer 205 may be trained together whereas the vocoder 206 may be trained separately to these components of the speech audio generation system.

Figure 3:
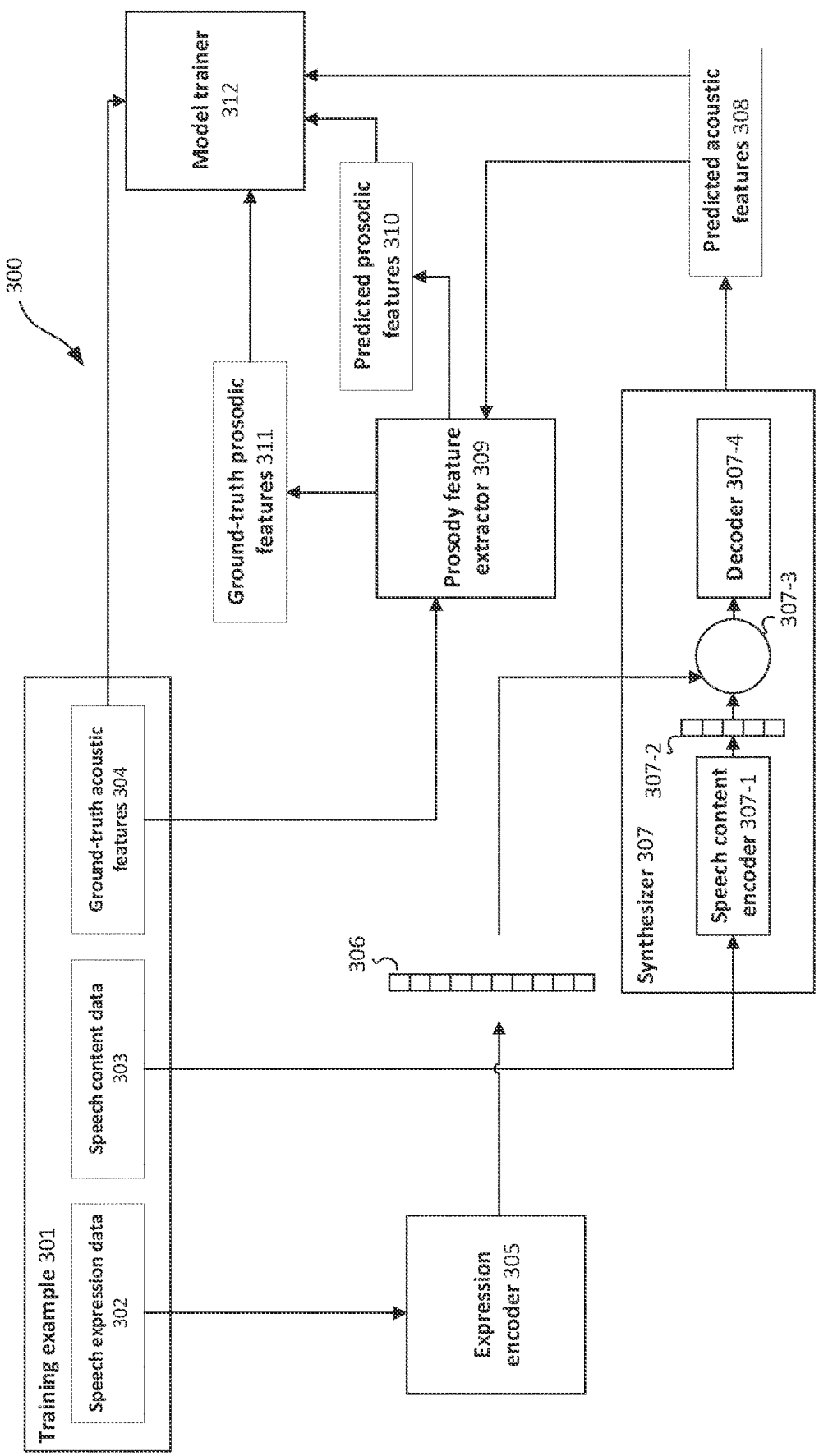
FIG. 3 illustrates an example method of training a machine-learned speech audio generation system.

FIG. 3 illustrates an example method 300 of training a machine-learned speech audio generation system. The method 300 involves receiving one or more training examples 301. Each training example 301 relates to an example of speech audio. In particular, each training example 301 comprises ground-truth acoustic features 304 determined from the example of speech audio, speech content data 303 representing the speech content of the speech audio, and speech expression data 302 representing the speech expression of the speech audio.

During training, the goal is to train the synthesizer 307 to generate predicted acoustic features 308 that closely match the ground-truth acoustic features 304 of the training example 301. In addition, the expression encoder 305 is trained to generate an expression embedding 306 that represents expression characteristics of the speech audio of the training example 301 from the speech expression data 302 of the training example 301. In particular, the method 300 uses a prosody feature extractor 309 in order to generate predicted acoustic features 308 such that the prosody of speech audio generated from the predicted acoustic features 308 closely matches the prosody of the speech audio of the training example 301.

The expression encoder 305 processes the speech expression data 302 of a training example 301 in accordance with a current set of parameters, and generates an expression embedding 306.

In some implementations, the expression encoder 305 may comprise a pre-trained portion. The pre-trained portion of the expression encoder 305 may be derived from a machine-learning model that has been trained on a separate task, such as language modelling. For example, the machine-learning model may comprise a trained neural network, and the pre-trained portion of the expression encoder 305 may comprise one or more neural network layers of the trained neural network (e.g. one or more layers preceding an output layer of the trained neural network). The machine-learning model may have been trained using training examples outside of the training examples 301 used to train the synthesizer 307. This may enable the expression encoder 305 to generate more representative/suitable expression embeddings 306 (e.g. that more accurately reflects characteristics of speech expression specified by speech expression data 302). In these implementations, the expression encoder 305 may further comprise an adaptive portion that is being trained to generate the expression embedding 306 from output of the pre-trained portion of the expression encoder 305. The adaptive portion may comprise one or more neural network layers. During training, parameters of the pre-trained portion of the expression encoder 305 may be fixed (i.e. not updated during training) while parameters of the adaptive portion may be updated.

In some implementations, the pre-trained portion of the expression encoder 305 may be derived from a transformer-based neural network that has been trained on a language modelling task. For example, the pre-trained portion of the expression encoder 305 may comprise one or more transformer encoder blocks and/or one or more transformer decoder blocks of a transformer-based neural network. A transformer block comprises a plurality of neural network layers that are configured to perform self-attention on a set of received input tokens to generate a representation for each of the input tokens. The pre-trained portion of the expression encoder 305 may further comprise one or more pooling layers to generate a single vector representation for the speech expression data 302. For example, the one or more pooling layers may be configured to generate the single vector representation from a representation, that has been generated by a transformer block (e.g. a final transformer block), of an overall token, wherein the overall token is a token used to represent the entirety of speech expression data 302. Additionally or alternatively, the one or more pooling layers may be configured to perform a mean and/or max operation on representations that have been generated by a transformer block (e.g. a final transformer block), wherein each representation corresponds to a representation of a particular token (e.g. character, word, etc.) of the speech expression data 302.

The speech content encoder 307-1 of the synthesizer 307 processes the speech content data 303 in accordance with a current set of parameters, and generates a speech content embedding 307-2. The synthesizer 307 combines the speech content embedding 307-2 and the expression embedding 306 using a combining operation 307-3 and generates a combined embedding.

The decoder 307-4 of the synthesizer 307 processes the combined embedding in accordance with a current set of parameters and generates predicted acoustic features 308 for the training example 301.

The prosody feature extractor 309 processes the predicted acoustic features 308 and generates predicted prosodic features 310. The prosody feature extractor 309 processes the ground-truth acoustic features 304 and generates "ground-truth" prosodic features 311. The prosodic features represent the prosody of speech audio corresponding to the respective acoustic features from which the prosodic features were generated. For example, the prosodic features may relate to (or represent) the volume and/or pitch of speech audio for the acoustic features. The prosody feature extractor 309 may output a single prosody vector representing global prosodic features for the acoustic features.

The prosody feature extractor 309 comprises a machine-learning model that has been trained to extract prosodic features from acoustic features. For example, the prosody feature extractor 309 may comprise a neural network comprising one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. The prosody feature extractor 309 may comprise an attention mechanism.

The prosody feature extractor 309 may have been trained in a separate training process to the example training process shown in FIG. 3. The prosody feature extractor 309 may be trained using training examples that each comprise acoustic features for speech audio and prosodic features that have been determined for the speech audio. For example, the determined prosodic features may comprise statistical features relating to the volume and/or pitch of the speech audio. The one or more statistical features may comprise: a mean, a variance, a maximum and a minimum of a pitch contour for the speech audio; and/or a mean, a variance, and a maximum of a volume contour for the speech audio. During training of the prosody feature extractor 309, the acoustic features of a training example are processed in accordance with a current set of parameters to generate predicted prosodic features. Parameters of the prosody feature extractor 309 are updated to minimize a measure of difference (e.g a mean-squared error) between the determined prosodic features of the training example and the predicted prosodic features. The parameters of the prosody feature extractor 309 may be updated any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

Model trainer 312 receives the predicted acoustic features 308, ground-truth acoustic features 304, predicted prosodic features 310, and ground-truth prosodic features 311 and updates parameters of the expression encoder 305 and synthesizer 307 in order to optimize an objective function.

The objective function comprises a reconstruction loss in dependence on the predicted acoustic features 308 and ground-truth acoustic features 304. The reconstruction loss measures a difference (e.g. an error) between the predicted acoustic features 308 and the ground-truth acoustic features 304. For example, the reconstruction loss may measure a mean-squared error.

The objective function further comprises a prosody loss in dependence on the predicted prosodic features 310 and the ground-truth prosodic features 311. The prosody loss measures a difference (e.g. an error) between the predicted prosodic feature 310 and the ground-truth prosodic features 311. For example, the prosody loss may measure a mean-squared error.

The objective function may comprise a weighted combination of the reconstruction loss and the prosody loss.

The parameters of the expression encoder 305 and synthesizer 307 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad. In particular, the parameters of the expression encoder 305 and synthesizer 307 are updated to minimize the reconstruction loss and the second classification loss.

During the training process, the model trainer 312 may be configured to freeze/fix parameters of the prosody feature extractor 309 such that they are not updated during the training of the expression encoder 305 and synthesizer 307.

The training process is repeated for a number of training examples, and is terminated at a suitable point in time, e.g. when predicted acoustic features 308 closely match ground-truth acoustic features 304. After the training process is terminated, the trained expression encoder 305 and synthesizer 307 are used to provide a machine-learned speech audio generation system.

The machine-learned speech audio generation system may further comprise a vocoder trained to generate speech audio from acoustic features. The machine-learned vocoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

A machine-learned vocoder is trained using training data comprising a plurality of training examples. Each training example includes acoustic features and a corresponding ground truth waveform of speech audio. The acoustic features may be determined from the ground-truth speech audio or provided from output of the trained synthesizer 307.

The vocoder may be trained in a separate training process to the example training processes illustrated in FIG. 3. During training, the vocoder processes the acoustic features of training examples to generate generated speech audio and its parameters are updated based on a comparison between the generated speech audio and the ground-truth speech audio. The parameters of the vocoder may be updated by optimizing an objective function and any suitable optimization procedure. For example, the objective function may be optimized using gradient-based methods such as stochastic gradient descent, mini-batch gradient descent, or batch gradient descent.

Figure 4:
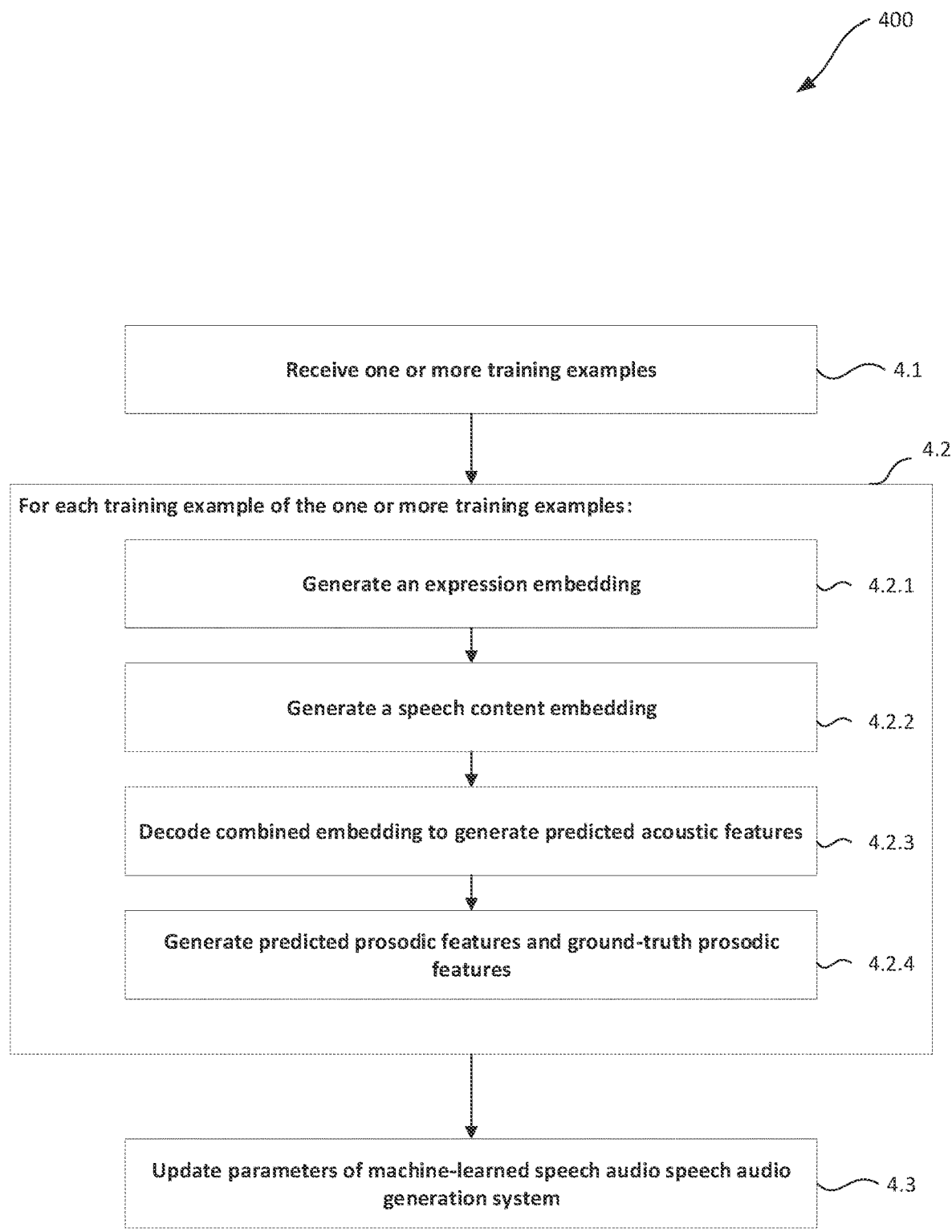
FIG. 4 is a flow diagram illustrating an example method of training a machine-learned speech audio generation system.

FIG. 4 is a flow diagram illustrating an example method 400 of training a machine-learned speech audio generation system. FIG. 4 displays a general overview of the methods described in relation to FIG. 3.

In step 4.1, one or more training examples are received. Each training example comprises: (i) ground-truth acoustic features for speech audio, (ii) speech content data representing speech content of the speech audio, and (iii) speech expression data representing speech expression of the speech audio.

Step 4.2 comprises steps 4.2.1 to 4.2.4 that are performed for each of the training examples.

In step 4.2.1, an expression embedding is generated by an expression encoder. This comprises processing the speech expression data. The expression encoder may comprise a portion of a pre-trained language model. The portion of the pre-trained language model may comprise one or more neural network layers of a pre-trained neural network. The one or more neural network layers of the pre-trained neural network may comprise a transformer block of a transformer-based neural network, wherein the transformer block is configured to perform self-attention on input tokens derived from the speech expression data. The expression encoder may further comprise an adaptive portion which is being trained. The adaptive portion of the expression encoder may comprise one or more neural network layers.

In step 4.2.2, a speech content embedding is generated by a speech content encoder of a synthesizer. This comprises processing the speech content data.

In step 4.2.3, a combined embedding is decoded by a decoder of the synthesizer to generate predicted acoustic features for the training example. The combined embedding comprises a combination of the expression embedding and the speech content embedding. The predicted acoustic features may comprise a representation of frequency, magnitude, and phase for generated speech audio.

In step 4.2.4, predicted prosodic features are generated by a prosody feature extractor by processing the predicted acoustic features. Ground-truth prosodic features are generated by the prosody feature extractor by processing the ground-truth acoustic features. The prosody feature extractor may comprise a machine-learning model that has been trained to extract prosodic features from acoustic features. The machine-learning model may be a neural network comprising an attention mechanism. The machine-learning model may have been trained to extract prosodic features relating to pitch and/or volume of speech audio represented by the acoustic features.

In step 4.3, parameters of the machine-learned speech audio generation system are updated. The parameters of the machine-learned speech audio generation system are updated by (i) minimizing a measure of difference between the predicted acoustic features for a training example and the corresponding ground-truth acoustic features of the training example, and (ii) minimizing a measure of difference between the predicted prosodic features for the training example and the corresponding ground-truth prosodic features for the training example. This may comprise updating parameters of each of the expression encoder and the synthesizer while fixing parameters of the prosody feature extractor.

Figure 5:
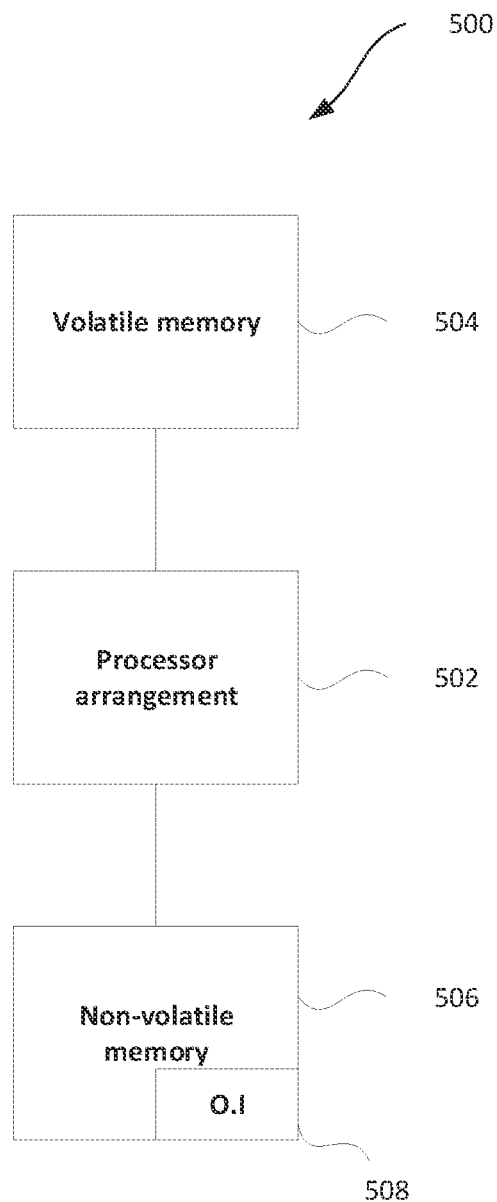
FIG. 5 shows a schematic example of a system/apparatus for performing any of the methods described herein.

FIG. 5 shows a schematic example of a system/apparatus 500 for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 500 comprises one or more processors 502. The one or more processors control operation of other components of the system/apparatus 500. The one or more processors 502 may, for example, comprise a general purpose processor. The one or more processors 502 may be a single core device or a multiple core device. The one or more processors 502 may comprise a central processing unit (CPU) or a graphical processing unit (GPU). Alternatively, the one or more processors 502 may comprise specialised processing hardware, for instance a RISC processor or programmable hardware with embedded firmware. Multiple processors may be included.

The system/apparatus comprises a working or volatile memory 504. The one or more processors may access the volatile memory 504 in order to process data and may control the storage of data in memory. The volatile memory 504 may comprise RAM of any type, for example Static RAM (SRAM), Dynamic RAM (DRAM), or it may comprise Flash memory, such as an SD-Card.

The system/apparatus comprises a non-volatile memory 506. The non-volatile memory 506 stores a set of operation instructions 508 for controlling the operation of the processors 502 in the form of computer readable instructions. The non-volatile memory 506 may be a memory of any kind such as a Read Only Memory (ROM), a Flash memory or a magnetic drive memory.

The one or more processors 502 are configured to execute operating instructions 508 to cause the system/apparatus to perform any of the methods described herein. The operating instructions 508 may comprise code (i.e. drivers) relating to the hardware components of the system/apparatus 500, as well as code relating to the basic operation of the system/apparatus 500. Generally speaking, the one or more processors 502 execute one or more instructions of the operating instructions 508, which are stored permanently or semi-permanently in the non-volatile memory 506, using the volatile memory 504 to temporarily store data generated during execution of said operating instructions 508.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 5, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method of training a machine-learned speech audio generation system to generate predicted acoustic features for generated speech audio for use in a video game, the training comprising:
   receiving one or more training examples, each training example comprising: (i) ground-truth acoustic features for speech audio, (ii) speech content data representing speech content of the speech audio, and (iii) speech expression data representing speech expression of the speech audio;
   for each of the one or more training examples:
      generating an expression embedding, comprising processing the speech expression data;
      generating a speech content embedding, comprising processing the speech content data;
      generating predicted acoustic features for the training example using at least the expression embedding and the speech content embedding;
      generating predicted prosodic features and ground-truth prosodic features, wherein generating the predicted prosodic features comprises processing the predicted acoustic features, and wherein generating the ground-truth prosodic features comprises processing the ground-truth acoustic features; and
   updating parameters of the machine-learned speech audio generation system based on at least (i) a measure of difference between the predicted acoustic features for a training example and the corresponding ground-truth acoustic features of the training example, and (ii) a measure of difference between the predicted prosodic features for the training example and the corresponding ground-truth prosodic features for the training example.

2. The method of claim 1, wherein the predicted prosodic features, and the ground-truth prosodic features, are generated by a machine-learning model that has been trained to extract prosodic features from acoustic features.

3. The method of claim 2, wherein the machine-learning model is a neural network comprising an attention mechanism.

4. The method of claim 2, wherein the machine-learning model has been trained to extract prosodic features relating to pitch and/or volume of speech audio represented by the acoustic features.

5. The method of claim 2, wherein the expression embedding is generated by an expression encoder, and wherein updating parameters of the machine-learned speech audio generation system comprises updating parameters of at least the expression encoder while fixing parameters of the machine-learning model that has been trained to extract prosodic features from acoustic features.

6. The method of claim 1, wherein an expression encoder comprises a portion of a pre-trained language model.

7. The method of claim 6, wherein the portion of the pre-trained language model comprises one or more neural network layers of a pre-trained neural network.

8. The method of claim 7, wherein the one or more neural network layers of the pre-trained neural network comprise a transformer block of a transformer-based neural network, wherein the transformer block is configured to perform self-attention on input tokens derived from the speech expression data.

9. The method of claim 6, wherein the expression encoder further comprises a trainable adaptive portion.

10. The method of claim 9, wherein the trainable adaptive portion of the expression encoder comprises one or more neural network layers.

11. A computing system to train a machine-learned speech audio generation system to generate predicted acoustic features for generated speech audio for use in a video game, wherein the system is configured to:
receive one or more training examples, each training example comprising: (i) ground-truth acoustic features for speech audio, (ii) speech content data representing speech content of the speech audio, and (iii) speech expression data representing speech expression of the speech audio;
for each of the one or more training examples:
generate an expression embedding, comprising processing the speech expression data;
generate a speech content embedding, comprising processing the speech content data;
generate predicted acoustic features for the training example using at least the expression embedding and the speech content embedding;
generate predicted prosodic features and ground-truth prosodic features, wherein generating the predicted prosodic features comprises processing the predicted acoustic features, and wherein generating the ground-truth prosodic features comprises processing the ground-truth acoustic features; and
update parameters of the machine-learned speech audio generation system based on at least: (i) a measure of difference between the predicted acoustic features for a training example and the corresponding ground-truth acoustic features of the training example, and (ii) a measure of difference between the predicted prosodic features for the training example and the corresponding ground-truth prosodic features for the training example.

12. The computing system of claim 11, wherein the expression embedding is generated by an expression encoder, and wherein updating parameters of the machine-learned speech audio generation system comprises updating parameters of at least the expression encoder.

13. The computing system of claim 11, wherein the predicted prosodic features, and the ground-truth prosodic features, are generated by a machine-learning model that has been trained to extract prosodic features from acoustic features.

14. The computing system of claim 11, wherein the expression embedding is generated by an expression encoder, the expression encoder comprising a portion of a pre-trained language model.

15. The computing system of claim 14, wherein the expression encoder further comprises a trainable adaptive portion.

16. The computing system of claim 11, wherein the predicted acoustic features comprise a representation of frequency, magnitude, and phase for generated speech audio.

17. A non-transitory computer-readable medium storing instructions, which when executed by a processor, cause the processor to:
receive one or more training examples, each training example comprising: (i) ground-truth acoustic features representing speech audio, (ii) speech content data representing speech content of the speech audio, and (iii) speech expression data representing speech expression of the speech audio;
for each of the one or more training examples:
generate an expression embedding, comprising processing the speech expression data;
generate a speech content embedding, comprising processing the speech content data;
generating predicted acoustic features for the training example using at least the expression embedding and the speech content embedding;
generate predicted prosodic features and ground-truth prosodic features, wherein generating the predicted prosodic features comprises processing the predicted acoustic features, and wherein generating the ground-truth prosodic features comprises processing the ground-truth acoustic features; and
update parameters of a machine-learned speech audio generation system based on at least: (i) a measure of difference between the predicted acoustic features for a training example and the corresponding ground-truth acoustic features of the training example, and (ii) a measure of difference between the predicted prosodic features for the training example and the corresponding ground-truth prosodic features for the training example.

18. The non-transitory computer-readable medium of claim 17, wherein the expression embedding is generated by an expression encoder, and wherein updating parameters of the machine-learned speech audio generation system comprises updating parameters of at least the expression encoder.

19. The non-transitory computer-readable medium of claim 17, wherein the expression embedding is generated by an expression encoder, and wherein the expression encoder comprises a portion of a pre-trained language model.

20. The non-transitory computer-readable medium of claim 17, wherein the prosodic features comprise features relating to pitch and/or volume of speech audio represented by the acoustic features.

* * * * *